(12) United States Patent
Viquez Calderon et al.

(10) Patent No.: US 11,544,116 B2
(45) Date of Patent: Jan. 3, 2023

(54) METHOD AND SYSTEM FOR FACILITATING DYNAMIC HARDWARE RESOURCE ALLOCATION IN AN ACTIVE SWITCH

(71) Applicant: Hewlett Packard Enterprise Development LP, Houston, TX (US)

(72) Inventors: Claudio Enrique Viquez Calderon, San Jose (CR); Marco Ney Rojas Jimenez, Heredia (CR); Royner G. Vargas, Heredia (CR); Fernando Cortes Campos, Moravia (CR)

(73) Assignee: Hewlett Packard Enterprise Development LP, Spring, TX (US)

( * ) Notice: Subject to any disclaimer, the term of this patent is extended or adjusted under 35 U.S.C. 154(b) by 102 days.

(21) Appl. No.: 17/107,124

(22) Filed: Nov. 30, 2020

(65) Prior Publication Data

US 2022/0171661 A1 Jun. 2, 2022

(51) Int. Cl.
*G06F 9/50* (2006.01)
*H04L 47/70* (2022.01)
*H04L 49/40* (2022.01)
*H04L 47/76* (2022.01)

(52) U.S. Cl.
CPC ............ *G06F 9/5077* (2013.01); *H04L 47/76* (2013.01); *H04L 47/82* (2013.01); *H04L 49/40* (2013.01); *G06F 2209/5011* (2013.01)

(58) Field of Classification Search
CPC ....... G06F 9/5077; H04L 47/76; H04L 47/82; H04L 49/40
See application file for complete search history.

(56) References Cited

U.S. PATENT DOCUMENTS

| | | | |
|---|---|---|---|
| 2011/0296052 A1* | 12/2011 | Guo | H04L 45/34 718/1 |
| 2018/0152366 A1* | 5/2018 | Cornett | G06F 3/067 |
| 2020/0007547 A1* | 1/2020 | Valiquette | G06F 15/17331 |
| 2022/0075664 A1* | 3/2022 | Fawcett | G06K 9/6256 |

* cited by examiner

*Primary Examiner* — Kristie D Shingles
(74) *Attorney, Agent, or Firm* — Park, Vaughan, Fleming & Dowler LLP

(57) ABSTRACT

A dynamic resource allocation system in a switch is provided. During operation, the system can represent, to an operational unit of the switch, a first subset of hardware elements of the switch that are allocated to the operational unit as a logical element. The system can then determine a request for dynamic reallocation of the hardware elements to the operational unit. Accordingly, the system may determine whether the reallocation of the hardware elements is feasible in the switch. If the reallocation of the hardware units is feasible, the system can allocate a second subset of the hardware elements to the operational unit during the runtime of the switch. The system can then incorporate the second subset of the hardware elements into the logical element.

22 Claims, 11 Drawing Sheets

METHOD AND SYSTEM FOR FACILITATING DYNAMIC HARDWARE RESOURCE ALLOCATION IN AN ACTIVE SWITCH

BACKGROUND

Field

The present disclosure relates to communication networks. More specifically, the present disclosure relates to a method and system for dynamically allocating hardware resources in an active switch.

BRIEF DESCRIPTION OF THE FIGURES

In the figures, like reference numerals refer to the same figure elements.

DETAILED DESCRIPTION

Figure 1:
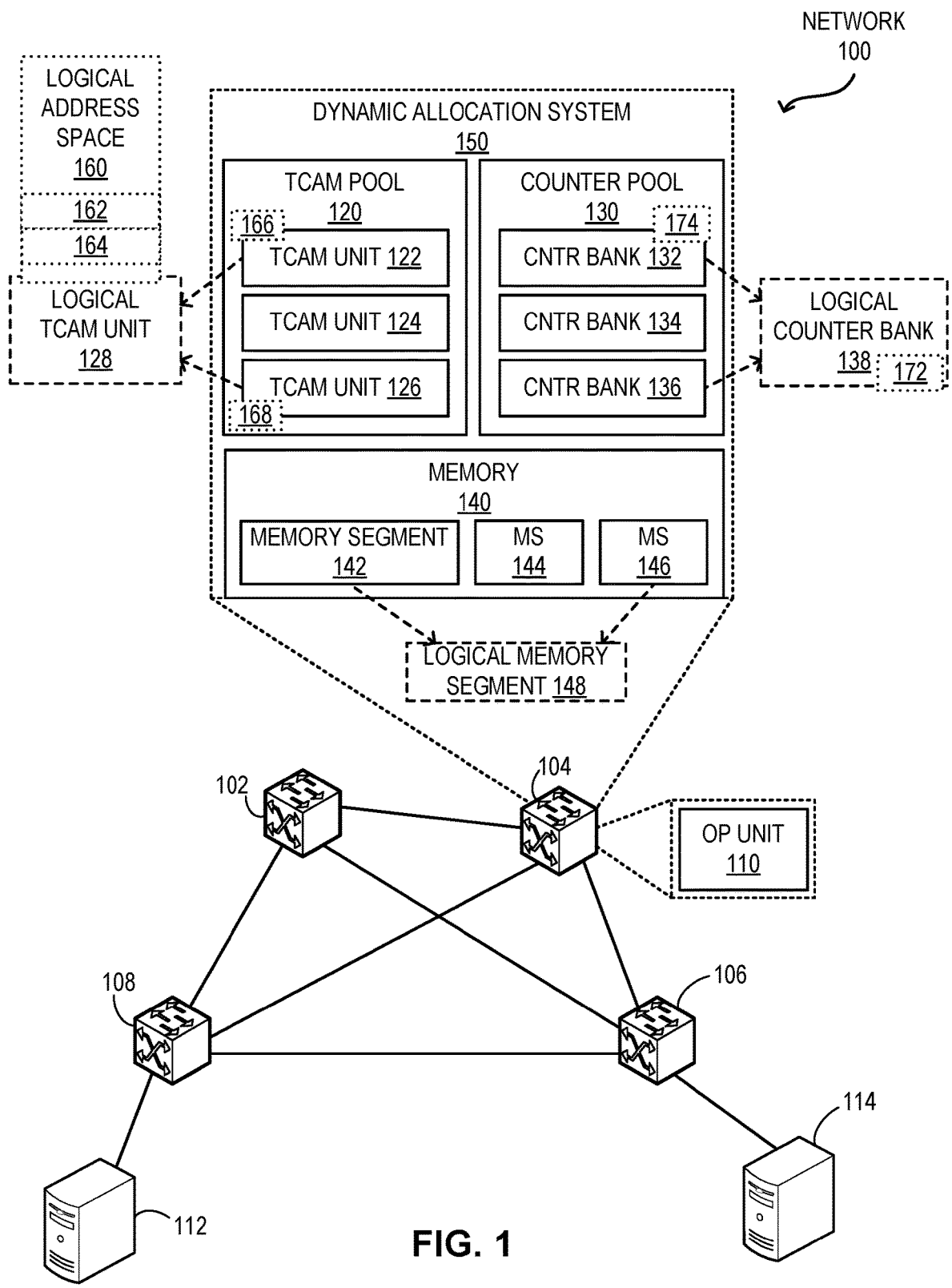
FIG. 1 illustrates an exemplary network with switches that support dynamic hardware source allocation based on resource virtualization, in accordance with an embodiment of the present application.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the claims.

Overview

The Internet is the delivery medium for a variety of applications running on physical and virtual devices. Such applications have brought with them an increasing demand for traffic. As a result, equipment vendors race to build switches with versatile capabilities. Consequently, a switch can include several operational units to support its capabilities. The resultant complexity of the switch can increase the difficulty of efficiently allocating hardware resources to a specific operational unit. Typically, a respective operational unit can be equipped with a static and predefined set of hardware resources. However, during the runtime of the switch (i.e., when the switch is active), an operational unit may exhaust its allocated resources. In contrast, another operational unit may under-utilize its allocated resources.

One embodiment of the present invention provides a system that can facilitate dynamic resource allocation in a switch. During operation, the system can represent, to an operational unit of the switch, a first subset of hardware elements of the switch that are allocated to the operational unit as a logical element. The system can then determine a request for dynamic reallocation of the hardware elements to the operational unit. Accordingly, the system may determine whether the reallocation of the hardware elements is feasible in the switch. If the reallocation of the hardware units is feasible, the system can allocate a second subset of the hardware elements to the operational unit during the runtime of the switch. The system can then incorporate the second subset of the hardware elements into the logical element.

In a variation on this embodiment, the hardware elements of the switch can include a set of ternary content-addressable memory (TCAM) units. The logical element can then be a logical TCAM unit presented to the operational unit.

In a variation on this embodiment, the hardware elements of the switch include a set of memory segments of a central memory of the switch, and wherein the logical element is a logical memory segment presented to the operational unit.

In a variation on this embodiment, the hardware elements of the switch can include a set of counter banks of hardware-based counters. The logical element can then be a logical counter bank presented to the operational unit.

In a further variation, the hardware elements of the switch can also include a set of memory counter banks maintained in a central memory of the switch. The system can then flush a current value of a respective counter of a counter bank to a corresponding memory counter. Here, the counter can be represented as a logical counter in the logical counter bank.

In a further variation, the system can maintain an accumulation counter for the logical counter. The system can then allocate the second subset of the hardware elements by adding respective values of the counter and the corresponding memory counter to the accumulation counter. The system can then re-associate the logical counter to a new counter in the second subset of the hardware elements.

In a variation on this embodiment, the reallocation of the hardware elements includes increasing or decreasing the first subset of the hardware elements to the second subset of the hardware elements. The system can then determine a target hardware element for the first subset of the hardware elements based on a selection policy and generate the second subset of the hardware elements from the first subset of the hardware elements.

In a further variation, the system can determine whether the reallocation of the hardware elements is feasible by determining whether the target hardware element is capable of accommodating valid data from the first subset of the hardware elements.

In a variation on this embodiment, the system can indicate, in a register of the switch, that the first subset of the hardware elements belongs to the logical element. The system can then incorporate the second subset of the hardware elements into the logical element by updating the register to indicate that the second subset of the hardware elements belongs to the logical element.

In a variation on this embodiment, the system can determine whether dynamic reallocation of a third subset of hardware elements allocated to a second operational unit is needed due to the allocation of the second subset of the hardware elements to the operational unit. If the dynamic reallocation to the second operational unit is needed, the system can dynamically allocate a fourth subset of the hardware elements to the second operational unit.

In a variation on this embodiment, the system can receive a command indicating the request for dynamic reallocation of the hardware elements for the operational unit. The system can then determine the reallocation operations and parameters for the dynamic reallocation.

The embodiments described herein solve the problem of efficiently allocating hardware resources to a respective operational unit of a switch by (i) maintaining the hardware resources of a switch as a global pool that can be allocated to different operational units, and (ii) dynamically allocating hardware resources to an operational unit from the global pool based on an allocation policy. The operational units can operate on the allocated resources without any changes to the operational units.

With existing technologies, the hardware resources of a switch, such as application-specific integrated circuit (ASIC) resources, are pre-allocated to the operational units based on static allocation. Examples of hardware resources of a switch include, but are not limited to, random-access memory (RAM), hash tables, counter banks, and ternary content-addressable memory (TCAM) units. An operational unit can be any hardware and/or software module of the switch that can facilitate a specific capability of the switch. For example, the operational unit can facilitate the operation of a specific layer of a network protocol stack, such as layer-2 (e.g., Ethernet processing and forwarding) and layer-3 (the Internet Protocol (IP) processing, routing, and forwarding). The operational unit can also facilitate specialized operations of the switch, such as policy-based forwarding and overlay tunneling.

An operational unit of the switch may be equipped with hardware resources that become exhausted during runtime. On the other hand, the hardware resources of another operational unit may remain under-utilized. For example, the switch may learn a large number of media access control (MAC) addresses during operation. Consequently, the TCAM units allocated to the layer-2 operational unit can become over-utilized. However, the switch may deploy a small number of policies and hence, the TCAM units allocated to the policy operational unit may remain under-utilized. However, because of the static pre-allocation, the switch may not be able to provide more TCAM units to the layer-2 operational unit or use the under-utilized TCAM units allocated to the policy operational unit. As a result, the operations of the switch can become significantly inefficient. Furthermore, even for the same operational unit, one type of hardware resource can become exhausted while another type of hardware resource can remain under-utilized. The static pre-allocation of hardware resources may also prevent the adjustment of different types of hardware resources based on the current demand.

To solve this problem, the hardware resources of a switch can be organized in a global pool that can be allocated to different operational units. Upon allocating hardware resources to an operational unit, the switch can store the identifiers of the hardware resources in a register associated with the resource configuration (e.g., a configuration register that can specify which physical resources belong to which logical entity). The switch can then represent the allocated hardware resources as a corresponding logical entity. The logical entity can include the hardware resources indicated by the register. This allows the switch to determine which hardware resources correspond to a logical entity of an operational unit.

For example, when the switch allocates a set of TCAM units to an operational unit, the switch can store the identifiers of the TCAM units in a register (e.g., a TCAM configuration register). The system can then represent the set of TCAM units as a logical TCAM unit. Similarly, when the switch allocates a set of counter banks to the operational unit, the switch can represent the set of counter banks as a logical counter bank. However, the operational unit may perceive the logical TCAM unit and the logical counter bank as a physical TCAM unit and a physical counter bank, respectively. As a result, the operational unit can use the logical representation without any changes to the operational unit.

To facilitate the logical representation, the switch can maintain a mapping between a respective address or index of a physical unit and a corresponding logical address. The physical address space of a TCAM unit can be mapped to a logical address space of the logical TCAM unit. The logical TCAM unit can span multiple physical TCAM units. The capacity (or size) of the logical TCAM unit can be the sum of the respective capacities of the physical TCAM units allocated to the operational unit. A respective address (or index) of a respective physical TCAM unit can be mapped to a corresponding logical address. The operational unit may perform a respective operation based on the logical address. The switch can then determine the corresponding physical address and execute the operation on the location identified by the physical address.

Suppose that the switch has allocated two TCAM units to the operational unit. Each TCAM unit can support n entries (i.e., n addresses or indices), each storing x (e.g., a multiple of 32) bits. The logical address space can then include 2n addresses. The 2n addresses of the two TCAM units can be mapped to the 2n addresses of the logical address space based on an allocation policy. Depending on the allocation, sequential addresses in the logical address space can be mapped to sequential or non-sequential addresses in the same or different physical TCAM units. The logical representation allows the switch to dynamically incorporate or remove underlying physical TCAM units. For instance, if a new TCAM unit with n entries is dynamically allocated to the operational unit, the new TCAM unit is incorporated into the logical TCAM unit and the corresponding logical address space is updated to incorporate 3n addresses. In the same way, if not needed, the switch can remove a TCAM unit from the logical TCAM unit and adjust the logical address space accordingly.

Furthermore, other hardware resources can allocated to the operational unit accordingly. For example, if the switch allocates TCAM units with 2n entries to the operational unit, the switch may also dynamically allocate counter banks comprising 2n counters. The allocated counter banks can be represented as a logical counter bank with 2n logical counters. Each logical counter may correspond to a physical counter in one of the counter banks. A respective physical counter can have y bits. In some embodiments, if a counter reaches a flush value, the switch can flush the current value from the counter and incorporate the physical counter value into the memory (e.g., the central memory or a static RAM (SRAM)) of the switch. The flush value can represent a value of the counter that cannot be incremented for a subsequent event. Suppose that the counter indicates the total number of bytes received by a port. Upon receiving a packet with a number of bytes that cannot be added to the counter due to a limit imposed by the y number bits, the switch can determine that the counter has reached its flush value.

The counter in the memory can be referred to as the memory counter. The switch can dedicate a specific location with z bits in the memory for maintaining the memory counter. The memory counter can be initialized with an initial value (e.g., a value of 0). Whenever the switch flushes the counter, the switch can add the value of the counter to the current value of the memory counter and reset the counter. Since the counters can be dynamically assigned, a counter bank currently allocated to one operational unit can be reallocated to another operational unit. To store the value of the reallocated counter bank, the switch can maintain an accumulation counter (e.g., a software-based counter) for a respective logical counter. For each reallocation, switch may first add the current value represented by the memory counter and the corresponding physical counter to the accumulation counter. Upon storing the value in the accumulation counter, the switch may reallocate the counter bank and its corresponding memory counters.

The switch can maintain a mapping between a logical counter and the corresponding physical counter. A register in the switch can indicate which counter banks belong to which logical counter bank. In some embodiments, a register associated with a counter bank may indicate the location of the bits in the memory that represent a respective memory counter associated with the counter bank (e.g., by maintaining a bitmap). Since each physical counter is allocated a corresponding set of bits in the memory for the memory counter, the mapping can indirectly incorporate the memory counter based on the location indicated by the register. Therefore, to obtain the value of a logical counter, the switch can obtain the value from the physical counter based on the mapping. The switch can also obtain the value from the memory counter based on the location indicated by the bitmap in the register. Subsequently, the switch can add the obtained values to the value of the accumulation counter to determine the logical counter value.

In this disclosure, the term "switch" is used in a generic sense, and it can refer to any standalone or fabric switch operating in any network layer. "Switch" should not be interpreted as limiting embodiments of the present invention to layer-2 networks. Any device that can forward traffic to an external device or another switch can be referred to as a "switch." Any physical or virtual device (e.g., a virtual machine/switch operating on a computing device) that can forward traffic to an end device can be referred to as a "switch." Examples of a "switch" include, but are not limited to, a layer-2 switch, a layer-3 router, a routing switch, a component of a Gen-Z network, or a fabric switch comprising a plurality of similar or heterogeneous smaller physical and/or virtual switches.

The term "packet" refers to a group of bits that can be transported together across a network. "Packet" should not be interpreted as limiting embodiments of the present invention to layer-3 networks. "Packet" can be replaced by other terminologies referring to a group of bits, such as "message," "frame," "cell," "datagram," or "transaction."

Network Architecture

FIG. 1 illustrates an exemplary network with switches that support dynamic hardware source allocation based on resource virtualization, in accordance with an embodiment of the present application. As illustrated in FIG. 1, a network 100 includes switches 102, 104, 106, and 108. In some embodiments, network 100 is a Gen-Z network and a respective switch of network 100, such as switch 102, is a Gen-Z component. A Gen-Z network can be a memory-semantic fabric that can be used to communicate to the devices in a computing environment. By unifying the communication paths and simplifying software through simple memory-semantics, Gen-Z components can facilitate high performance solutions for complex systems. Under such a scenario, communication among the switches in network 100 is based on memory-semantic fabric. In some further embodiments, network 100 is an Ethernet and/or IP network, and a respective switch of network 100, such as switch 102, is an Ethernet switch and/or IP router. Under such a scenario, communication among the switches in network 100 is based on Ethernet and/or IP.

With existing technologies, the hardware resources of switch 104, such as ASIC resources, are pre-allocated to the operational units, such as operational unit 110, based on static allocation. Hardware resources of switch 104 can include central memory 140 (e.g., an SRAM of switch 104), a plurality of TCAM units 122, 124, and 126, and a plurality of counter banks 132, 134, and 136. Memory 140 can include a plurality of memory segments 142, 144, and 146. Operational unit 110 can be any hardware and/or software module of switch 104 that can facilitate a specific capability of switch 104. For example, operational unit 110 can facilitate the operation of a specific layer of a network protocol stack, such as layer-2 and layer-3. Operational unit 110 can also facilitate specialized operations of switch 104, such as policy-based forwarding and overlay tunneling.

Suppose that TCAM units 122 and 126, as well as counter banks 132 and 136, are statically pre-allocated to operational unit 110. If operational unit 110 is the layer-2 processing engine for switch 104, the MAC addresses learned at switch 110 can be stored in the layer-2 forwarding table (or MAC address table) maintained in TCAM units 122 and 126. Therefore, a large number of MAC addresses learned at switch 104 may over-utilize TCAM units 122 and 126. However, because of the static pre-allocation, switch 104 may not be able to provide more TCAM units to operational unit 110 or use the under-utilized TCAM units allocated to another unit. As a result, the operations of switch 104 can become inefficient. Furthermore, even for operational unit 110, TCAM units 122 and 126 can become exhausted while counter bank 136 can remain under-utilized. The static pre-allocation of hardware resources may also prevent the adjustment of different hardware resources based on the current demand.

To solve this problem, the hardware resources of switch 104 can be organized in a global pool that can be allocated to different operational units. For example, TCAM units 122, 124, and 126 can be organized in a TCAM pool 120.

Similarly, counter banks 132, 134, and 136 can be organized in a counter pool 130. A respective physical counter, such as counter 164 in counter bank 132, can have y bits. Switch 104 can be equipped with a dynamic allocation system 150 that can allocate the hardware resources of switch 104 to operational unit 110 during runtime (i.e., when switch 104 is actively operating in network 100 and forwarding packets). System 150 can program and configure the underlying hardware resources (e.g., configuring the ASIC) for the dynamic allocation of the hardware resources.

During the initiation (e.g., the booting-up or power-cycle process), system 150 can allocate TCAM units 122 and 126 to operational unit 110. Switch 150 can store the identifiers of TCAM units 122 and 126 in a TCAM configuration register that can specify which physical TCAM units are allocated to which logical TCAM unit. For example, the register can indicate that TCAM units 122 and 126 are allocated to logical TCAM unit 128. In this way, system 150 can represent TCAM units 122 and 126 as a logical TCAM unit 128 based on the entries in the register. Similarly, system 150 can allocate counter banks 132 and 136 to operational unit 110. System 150 can represent counter banks 132 and 136 as a logical counter bank 138. In the same way, system 150 can allocate memory segments 142 and 146 to operational unit 110. System 150 can represent memory segments 142 and 146 as a logical memory segment 148.

However, operational unit 110 may perceive logical TCAM unit 128, logical counter bank 138, and logical memory segment 148 as a physical TCAM unit, a physical counter bank, and a physical memory segment, respectively. As a result, operational unit 110 can use the logical representation without any changes to operational unit 110. To facilitate the logical representation of logical TCAM unit 128, logical counter bank 138, and logical memory segment 148, system 150 can maintain a mapping between the logical entity and the underlying physical entities. For example, the physical address space of TCAM units 122 and 126 can be mapped to a logical address space 150 of logical TCAM unit 128. The capacity of logical TCAM unit 128 can be the sum of the respective capacities of TCAM units 122 and 126.

A respective address (or index) of TCAM units 122 and 126 can be mapped to a corresponding logical address in logical address space 150. For example, address 156 of TCAM unit 122 and address 158 of TCAM unit 126 can be mapped to logical addresses 152 and 154, respectively. Operational unit 110 can perform an operation (e.g., adding, removing, and updating an entry) based on a corresponding logical address, such as logical address 152. By looking up logical address 152 in the mapping, system 150 can determine physical address 156. Switch 104 can then execute the operation on the location identified by physical address 156.

Suppose that each of TCAM units 122 and 126 can support n number of entries (i.e., n addresses or indices), each storing x (e.g., a multiple of 32) bits. Logical address space 150 can then include 2n addresses. The 2n addresses of TCAM units 122 and 126 can be mapped to the 2n addresses of logical address space 150 based on an allocation policy. Depending on the allocation, sequential addresses 152 and 154 can be mapped to sequential or non-sequential addresses in the same or different TCAM units. Logical TCAM unit 128 allows system 150 to incorporate or remove underlying physical TCAM units dynamically.

For instance, TCAM unit 124, which may support m entries, can be dynamically allocated to operational unit 110. TCAM unit 124 can then be incorporated into logical TCAM unit 128. Accordingly, logical address space 150 is updated to incorporate 2n+m logical addresses. In the same way, if not needed, system 150 may remove TCAM unit 126 from logical TCAM unit 128 and adjust logical address space 150. Accordingly, logical address space 150 is updated to represent n+m logical addresses.

Furthermore, if system 150 allocates TCAM units 122 and 126 with 2n entries to operational unit 110, system 150 may also dynamically allocate counter banks 132 and 136 comprising 2n counters. Counter banks 132 and 136 can be represented as logical counter bank 138 with 2n logical counters. Each logical counter may correspond to a physical counter in counter bank 132 or 136. For example, a logical counter 162 can be mapped to underlying physical counter 164 in counter bank 132. Consequently, if operational unit 110 increases the value of logical counter 162, system 150 can determine the underlying physical counter 164. Switch 104 can then incorporate the increment into physical counter 164.

Similar to the allocation of TCAM units, system 150 can allocate memory segments 142 and 146, which can be separate memory modules or a particular portions of memory 140 represented by corresponding memory ranges, to operational unit 110. If the capacity of memory segments 142 and 146 are 2q and q bytes, the capacity of logical memory segment 148 can be 3q bytes. A respective memory location of logical memory segment 148 can be identified by a logical memory address. System 150 can maintain a mapping that maps a respective memory location of memory segment 148 to a corresponding physical memory location in memory segments 142 or 146. When operational unit 110 performs an operation on (e.g., reads from or writes to) logical memory segment 148 based on a logical address, system 150 can obtain the corresponding physical address from the mapping and perform the operation in the physical memory location.

After the initial allocation, system 150 may increase or decrease the capacity of logical TCAM unit 128, logical counter bank 138, and logical memory segment 148. Decreasing a logical entity can include deleting that logical unit. System 150 can provide a set of commands that a user may execute to increase or decrease logical TCAM unit 128, logical counter bank 138, and logical memory segment 148. For example, a command can be for a logical entity (e.g., a logical TCAM unit or a logical counter bank) that can perform an operation (increase, decrease, or delete). The command may receive, from the user, a set of parameters, such as the target capacity. System 150 can then execute the operation indicated by the command.

In other words, the user may not specify which physical element would be allocated for a command. Instead, the user may specify whether to increase or decrease a logical entity and the target capacity. System 150 can then increase or decrease a logical entity to the target capacity (i.e., dynamically reallocate hardware resources) on-demand based on a user command without interrupting traffic on switch 104. In this way, system 150 can determine the operations and parameters associated with the dynamic reallocation.

Figure 2A:
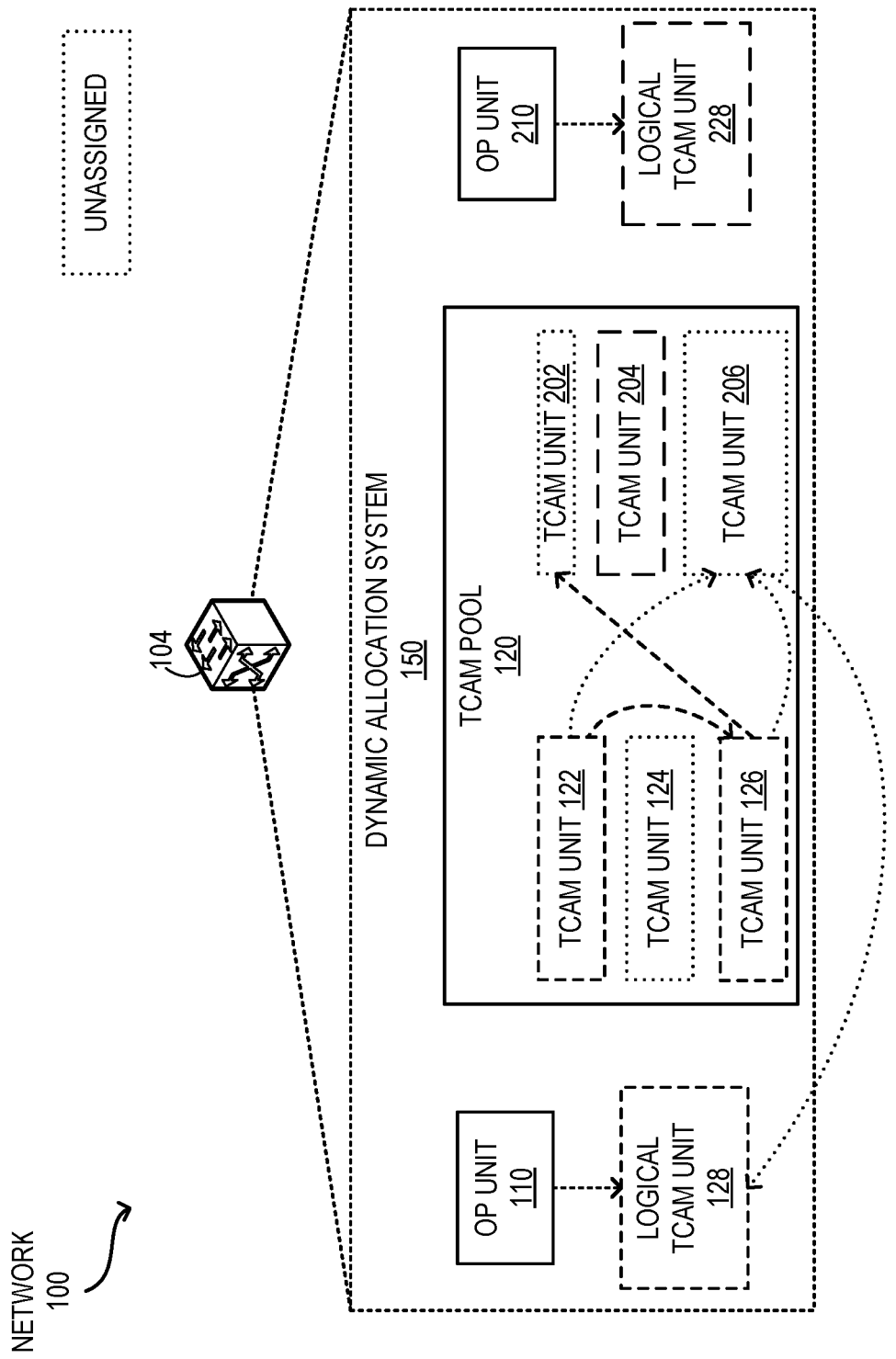
FIG. 2A illustrates an exemplary process of dynamically increasing memory resources allocated to an operational unit of a switch, in accordance with an embodiment of the present application.

FIG. 2A illustrates an exemplary process of dynamically increasing memory resources allocated to an operational unit of a switch, in accordance with an embodiment of the present application. Suppose that, in addition to TCAM units 122, 124, and 126, TCAM pool 120 can further include TCAM units 202, 204, and 206. The TCAM units of TCAM pool 120 can be of different capacities (or sizes). For example, TCAM units 122, 124, 126, and 204 can support n entries, TCAM unit 202 can support m entries, and TCAM unit 206 can support p entries. Each entry in a TCAM unit can support x bits (e.g., a multiple of 32). In some embodiments, the values of n, m, and p can be 2048, 1024, and 4096, respectively. System 150 can allocate TCAM units 122 and 126 to operational unit 110 as logical TCAM unit 128. Similarly, system 150 can allocate TCAM unit 204 to operational unit 210 as logical TCAM unit 228. Hence, logical TCAM units 128 and 228 can represent 2n and n entries, respectively.

After the initial allocation, system 150 may increase or decrease the respective capacities of logical TCAM units 128 and 228. During operation, the user may determine that logical TCAM unit 128 may need to accommodate more entries for operational unit 110. The user can then issue a command to system 150 for dynamically increasing the capacity of logical TCAM unit 128 to a new target capacity (e.g., to accommodate 2n+m entries). System 150 can then determine which available TCAM units in TCAM pool 120 may fulfill the target capacity requirement. Subsequently, system 150 can select a target TCAM unit in such a way that logical TCAM unit 128 can accommodate the new target capacity. System 150 can then accommodate the target TCAM unit into logical TCAM unit 128.

In some embodiments, system 150 can deploy a selection policy for selecting the target TCAM unit. Examples of the selection policy can include, but are not limited to, efficient fit, incremental fit, first-available, and random selection. For the efficient-fit selection, system 150 can select the target TCAM unit(s) with the smallest capacity that can accommodate the target capacity with the minimum residual capacity (e.g., capacity more than the target capacity). System 150 can then determine whether data transfer is required for the selection based on whether the target TCAM unit replaces the currently allocated TCAM unit.

System 150 can determine that available TCAM units 124, 202, and 206 have capacities n, m, and p, respectively. If 2n+m=p, system 150 can select TCAM unit 206 as the target TCAM unit. Since TCAM unit 206 may replace currently allocated TCAM units 122 and 126, system 150 can determine that data transfer is required. System 150 can then transfer the valid entries from TCAM units 122 and 126 to TCAM unit 206, incorporate TCAM unit 206 into logical TCAM unit 128, and release TCAM units 122 and 126 for subsequent allocation (denoted with dotted arrows). To incorporate TCAM unit 206 into logical TCAM unit 128, system 150 can update the TCAM configuration register.

On the other hand, for incremental-fit selection, system 150 can select the target TCAM unit(s) with the smallest capacity that can accommodate the incremental capacity with the minimum residual capacity. System 150 can then determine whether data transfer is required for the selection based on whether the current entries require redistribution. In the example in FIG. 2A, system 150 can select TCAM unit 202 as the target TCAM unit (denoted with dashed arrows). Since TCAM unit 202 may provide more redistribution of current entries, system 150 can determine that data transfer is needed.

Accordingly, system 150 can incorporate TCAM unit 202 into logical TCAM unit 128 and redistribute the existing TCAM entries of TCAM units 122 and 126 into allocated TCAM units 122, 126, and 202 (denoted with dashed arrows). The redistribution can facilitate the insertion of an entry or update to an entry without reorganizing current TCAM entries. Otherwise, if one of TCAM units 122 and 126 becomes highly-utilized (e.g., becomes full), the movement of a large number of TCAM entries to TCAM unit 202 can become inefficient.

It should be noted that, to move data from TCAM unit 122 to another TCAM unit 202, system 150 may not select any random location in TCAM 202. The entries in a TCAM unit are stored based on their respective priorities or ranks. System 150 can move the data in such a way that the priorities are preserved at TCAM unit 202. The rank (or priority) of an entry in a TCAM unit indicates which entry should be selected if multiple entries match. Typically, an entry with a lower rank number has a higher priority than an entry with a higher rank number. In some embodiments, a higher-priority entry can be stored before (e.g., at a lower index value) than a lower-priority entry. The entries can then be looked-up in a TCAM unit in such a way that the earlier match is selected for processing.

For example, if operational unit 110 forwards layer-3 packets based on the longest-prefix matching, entries in logical TCAM unit 128 can store to IP addresses. Suppose that two entries in logical TCAM unit 128 (e.g., in TCAM unit 122) include {Rank 0, 192.168.0.2} and {Rank 100, 192.168.*.*}. If a packet with an IP destination address 192.168.0.2 arrives at switch 104, the destination address can match both entries. However, the first entry can be selected for forwarding the packet since the lower-rank value may indicate a higher priority. Therefore, if these two entries are moved from TCAM unit 122 to TCAM unit 202, system 150 can maintain the corresponding priorities TCAM unit 202.

Figure 2B:
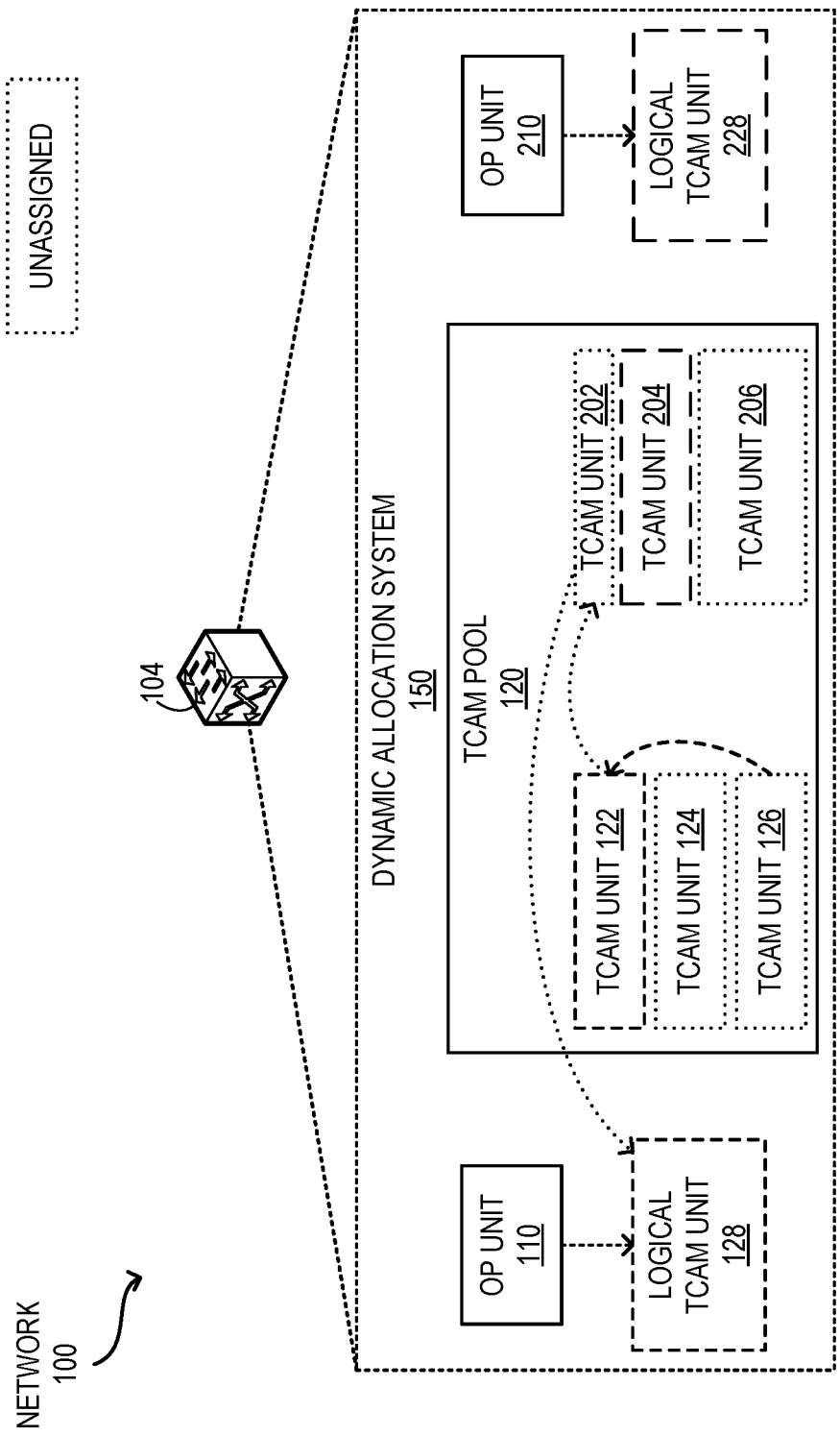
FIG. 2B illustrates an exemplary process of dynamically decreasing memory resources allocated to an operational unit of a switch, in accordance with an embodiment of the present application.

FIG. 2B illustrates an exemplary process of dynamically decreasing memory resources allocated to an operational unit of a switch, in accordance with an embodiment of the present application. During operation, the user may determine that logical TCAM unit 128 can operate with fewer entries for operational unit 110. The user can then issue a command to system 150 for dynamically decreasing the capacity of logical TCAM unit 128 to a new target capacity (e.g., from 2n entries to m entries). System 150 can then mark the freed TCAM unit(s) as unavailable so that the freed TCAM unit(s) can be reallocated to another operational unit. System 150 can remove a TCAM unit from logical TCAM unit 128 based on the user command without interrupting traffic at switch 104.

System 150 may ensure that the remaining TCAM units (or a new target TCAM unit) can accommodate the valid entries in the TCAM unit(s) that are going to be disassociated from the logical TCAM unit. For the efficient-fit selection, system 150 can determine that unassigned TCAM unit 202 has a capacity of m entries. System 150 can then determine whether TCAM unit 202 can accommodate the valid entries in TCAM units 122 and 126. If TCAM unit 202 cannot accommodate the valid entries, system 150 may fall back to another allocation policy or provide an error message to the user. Otherwise, system 150 can allocate TCAM unit 202 to operational unit 110 and incorporate TCAM unit 202 into logical TCAM unit 128.

System 150 can then move a respective valid entry from TCAM units 122 and 126 (i.e., TCAM units 122 and 126 are the decrement TCAM unit) to TCAM unit 202 (denoted with a dotted line). When TCAM units 122 and 126 become empty, system 150 can disassociate TCAM units 122 and 126 from logical TCAM unit 128. On the other hand, for incremental-fit selection, system 150 can select one of TCAM units 122 and 126 that can support at least m entries. If the capacities of TCAM units 122 and 126 are larger than the target capacity (e.g., n>m), system 150 can determine which TCAM unit can accommodate the valid entries of the other TCAM unit.

If neither of TCAM units 122 and 126 can accommodate the other TCAM unit's valid entries, system 150 may fall back to another allocation policy or provide an error message to the user. On the other hand, if both TCAM units 122 and 126 can, system 150 can select one of TCAM units 122 and 126 with the minimum residual capacity. Suppose that system 150 has selected TCAM unit 126 for removal (i.e., TCAM unit 126 is the decrement TCAM unit). System 150 can then move a respective valid entry from TCAM unit 126 to TCAM unit 122 (denoted with dashed lines). When TCAM unit 126 becomes empty, system 150 can disassociate TCAM unit 126 from logical TCAM unit 128, thereby making TCAM unit 126 available for a subsequent allocation.

Both selection processes include the movement of valid entries to a target TCAM unit. To facilitate data movement, system 150 can copy an entry from a source TCAM unit (e.g., TCAM unit 126) to a new entry location in the target TCAM unit (e.g., TCAM unit 202 or 122). System 150 can then enable the new entry in the target TCAM unit and disable the old entry in the TCAM unit selected for removal. System 150 can then remove the old entry. In some embodiments, System 150 can perform the reallocation as an atomic operation by updating the register that specifies which TCAM units belong to logical TCAM unit 128. For example, system 150 can deploy a lock on logical TCAM unit 128 to prevent the creation of new entries in logical TCAM unit 128 during the movement of data from one TCAM unit to another.

Figure 3A:
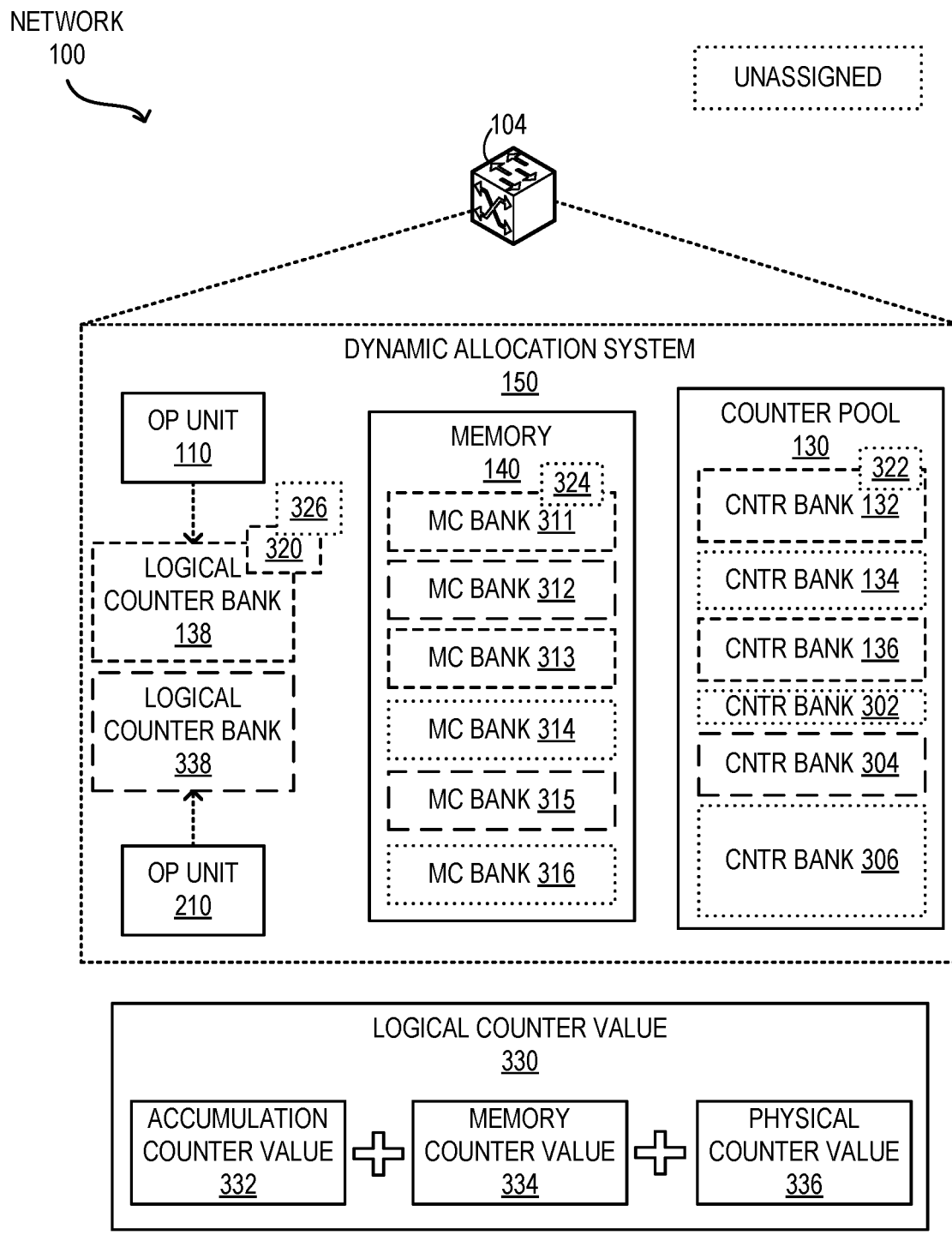
FIG. 3A illustrates an exemplary process of managing counter resources of a switch, in accordance with an embodiment of the present application.

System 150 can allocate other hardware resources, such as counter banks, to operational units 110 and 210. FIG. 3A illustrates an exemplary process of managing counter resources of a switch, in accordance with an embodiment of the present application. Suppose that, in addition to counter banks 132, 134, and 136, counter pool 130 can further include counter banks 302, 304, and 306. In some embodiments, a respective counter bank can be based on a counter RAM. A specific number of bits (e.g., y bits, which can be a multiple of 32) at a specific location of the counter RAM can be allocated as a counter. The counter banks of counter pool 130 can be of different capacities (or sizes). For example, counter banks 122, 124, 126, and 304 can support a entries, counter bank 302 can support b entries, and counter bank 306 can support c entries.

In some embodiments, the values of a, b, and c can be n, m, and p, respectively. Typically, if system 150 allocates TCAM units with 2n entries to operational unit 110, system 150 may also dynamically allocate counter banks comprising 2n counters. Accordingly, system 150 can allocate counter banks 132 and 136 to operational unit 110 as logical counter bank 138. For example, if each of counter banks 132 and 136 includes 2048 counters, logical counter bank 138 can include 4096 counters. Similarly, system 150 can allocate counter bank 304 to operational unit 210 as logical counter bank 338. Hence, logical counter banks 138 and 338 can represent 2a and a entries, respectively.

It should be noted that the number of counters allocated to an operational unit (i.e., the number of counters in the corresponding logical counter bank) may not correspond to the number of entries in the logical TCAM unit of that operational unit. The correspondence between the numbers depends on how many TCAM entries require a counter. Operational units 110 and 210 may not be aware of the virtualization of logical counter banks 138 and 338. Therefore, operational units 110 and 210 may access logical counter banks 138 and 338, respectively, without considering the underlying physical counter banks. For example, operational units 110 can operate without considering that logical counter bank 138 is implemented over two distinct physical counter banks 132 and 136. This allows system 150 to associate and disassociate a physical counter bank from logical counter bank 138 during runtime without disrupting traffic.

Each logical counter in logical counter bank 138 may correspond to a physical counter in counter bank 132 or 136. For example, logical counter 320 of logical counter bank 138 can correspond to counter 322 of counter bank 132. A respective physical counter can have y bits. In some embodiments, system 150 can maintain a memory counter bank for a respective physical counter bank. For example, system 150 can maintain memory counter banks 311, 312, 313, 314, 315, and 316 in memory 140 for counter banks 132, 134, 136, 302, 304, and 306, respectively. If counter 322 reaches a flush value, system 150 can flush the current value from counter 322 and incorporate the counter value into a memory counter 324 in memory counter bank 311. For example, if counter 322 indicates the total number of bytes received by a port of switch 104, system 150 can determine that counter 322 has reached the flush value if counter 322 cannot be increased to count the number of bytes in a new packet without counter 322 wrapping around.

System 150 may also periodically flush the value of counter 322 to memory counter 324. System 150 can dedicate a specific location with z bits, which may include at least 2y bits, in a specific location in memory 140 for maintaining memory counter 324. Memory counter 324 can be initialized with an initial value (e.g., a value of 0). Whenever system 150 flushes counter 322, system 150 can add the value of counter 322 to the current value of memory counter 324 and reset counter 322 (e.g., to a value of 0). Since the counters can be dynamically assigned, counter bank 132 currently allocated to operational unit 110 can be reallocated to another operational unit.

To store the value of reallocated counter bank 132, system 150 can maintain an accumulation counter (e.g., a software-based counter) for a respective logical counter. To reallocate counter bank 132, system 150 may incorporate the current value of a respective counter and its corresponding memory counter into an accumulation counter. For example, system 150 may add the respective current values of memory counter 324 and counter 322 to corresponding accumulation counter 326. System 150 can repeat this process for a respective counter of counter bank 132. Upon storing the counter and memory counter values in corresponding accumulation counters, system 150 may reallocate counter bank 132 and its corresponding memory counters.

System 150 can maintain a mapping between logical counter 320 and counter 322. A register in switch 104 can indicate which counter banks belong to which logical counter bank. In some embodiments, a register associated with counter bank 132 may indicate the location of the bits in memory 140 that represent a respective memory counter associated with counter bank 132 (e.g., by maintaining a bitmap). In other words, the register may indicate the location of the bits in memory 140 that represent memory counter 324. Since each physical counter is allocated a corresponding set of bits in memory 140 for the memory counter, the mapping can indirectly incorporate memory counter 324 based on the location indicated by the register.

Therefore, to obtain the value of logical counter 320, system 150 can obtain the value from counter 322 based on the mapping. System 150 can also obtain the value from memory counter 324 based on the location indicated by the register. Subsequently, system 150 can add the obtained values to the value of accumulation counter 326 to determine the logical counter value. Therefore, a respective logical counter value 330 can be the sum of an accumulation counter value 332, a memory counter value 334, and a physical counter value 336.

Figure 3B:
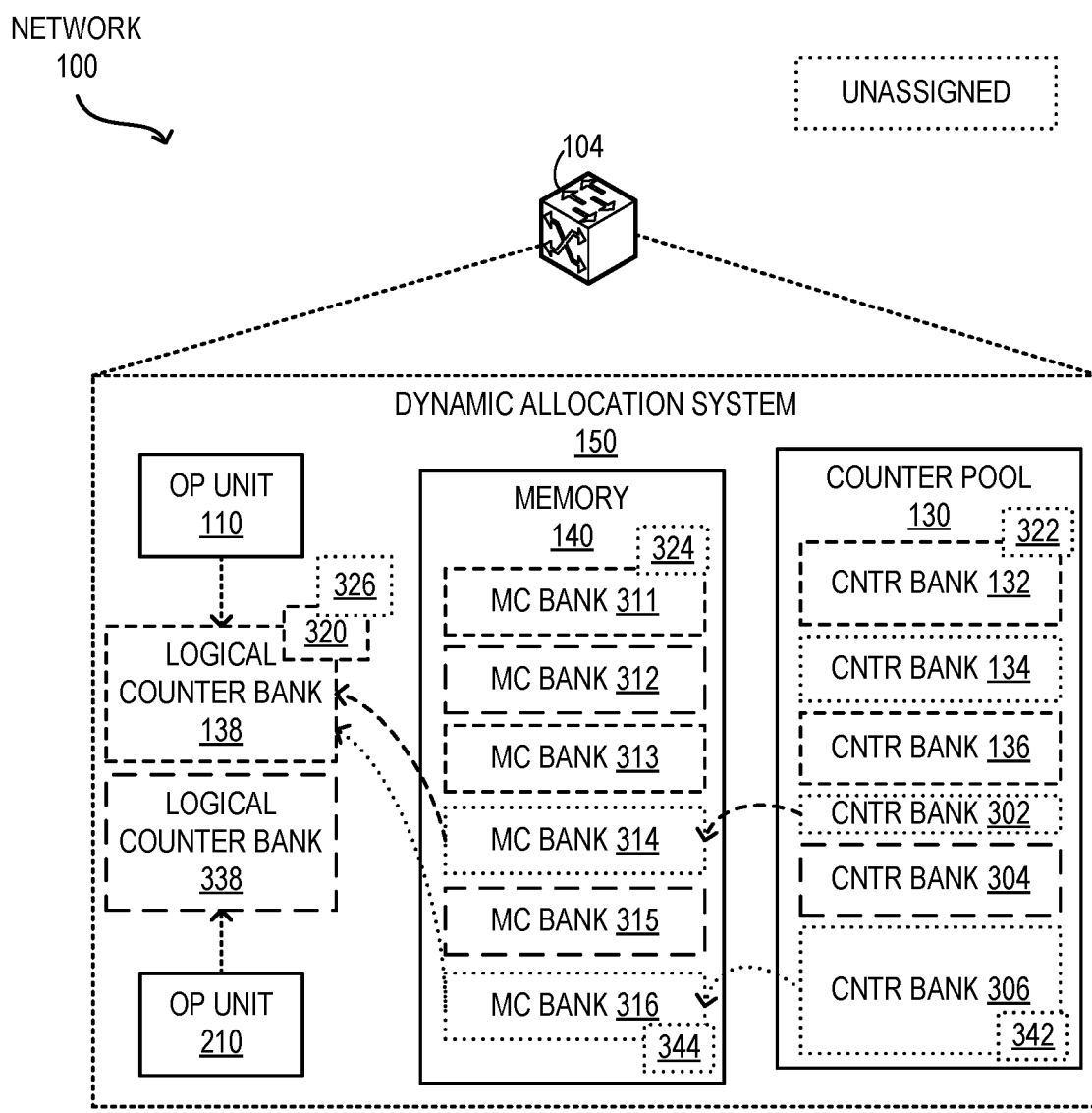
FIG. 3B illustrates an exemplary process of dynamically increasing counter resources allocated to an operational unit of a switch, in accordance with an embodiment of the present application.

FIG. 3B illustrates an exemplary process of dynamically increasing counter resources allocated to an operational unit of a switch, in accordance with an embodiment of the present application. During operation, the user may determine that logical counter bank 138 may need to accommodate more counters for operational unit 110. The user can then issue a command to system 150 for dynamically increasing the capacity of logical counter bank 138 to a new target capacity (e.g., to accommodate 2a+b entries). System 150 can then determine which available counter banks in counter pool 130 may fulfill the target capacity requirement. Subsequently, system 150 can select a target counter bank in such a way that logical counter bank 138 can accommodate the new target capacity. System 150 can then accommodate the target counter bank into logical counter bank 138.

In some embodiments, system 150 can deploy a selection policy for selecting the target counter bank. Examples of the selection policy can include, but are not limited to, efficient fit, incremental fit, first-available, and random selection. For the efficient-fit selection, system 150 can select the target counter bank(s) with the smallest capacity that can accommodate the target capacity with the minimum residual capacity. System 150 can then determine whether data transfer is required for the selection based on whether the target counter bank replaces currently allocated counter banks. Subsequently, system 150 can determine that available counter banks 134, 302, and 306 have capacities a, b, and c, respectively. If 2a+b=c, system 150 can select counter bank 306 as the target counter bank.

Since counter bank 306 may replace currently allocated counter banks 132 and 136, system 150 can determine that data transfer is required. System 150 can then incorporate counter bank 306 into logical counter bank 138, and release counter banks 132 and 136 for subsequent allocation (denoted with dotted arrows). System 150 can perform the reallocation as an atomic operation by updating the register that specifies which physical counter banks belong to logical counter bank 138. In this way, system 150 can then map a respective logical counter in logical counter bank 138 to a physical counter in counter bank 306. To incorporate counter bank 306 into logical counter bank 138, system 150 can add the values from a respective counter and the corresponding memory counter to the accumulation counter.

For example, system 150 can add the values from counter 322 and memory counter 324 to the current value of accumulation counter 326 associated with logical counter 320. System 150 may deploy a lock on logical counter bank 138 during the reallocation process for maintaining consistency. System 150 can then map logical counter 320 to counter 342 of counter bank 306. Since counter 342 is associated with memory counter 344, the mapping indirectly incorporates memory counter 344 as well. For any subsequent event, counter 342 can be increased, and the summation of the increased value and the value of accumulation counter 326 can represent the value of logical counter 320. Consequently, the total value of logical counter 320 can be the sum of respective values of accumulation counter 326, memory counter 344, and counter 342. In this way, the counter values accumulated by counter 322 and memory counter 324 are preserved by accumulation counter 326 of logical counter 320.

On the other hand, for incremental-fit selection, system 150 can select the counter bank with the smallest capacity that can accommodate the incremental capacity with the minimum residual capacity. System 150 can then determine whether data transfer is required for the selection based on whether the current counters require redistribution. In the example in FIG. 2A, system 150 can select counter bank 302 as the target counter bank (denoted with dashed arrows). Consequently, the number of logical counters in logical counter bank 138 can be increased to 2a+b. System 150 can initiate b new accumulation counters for logical counter bank 138 for any subsequent reallocation.

In some embodiments, for each reallocation of a counter bank, system 150 may evaluate how to efficiently distribute the physical counter banks for a respective counter bank of switch 104. For example, system 150 can apply the efficient-fit selection iteratively. Suppose that counter bank 306 is currently allocated to logical counter bank 338. As a result, system 150 may not be able to allocate counter bank 306 to logical counter bank 338 to increase the number of logical counters in logical counter bank 138 to 2a+b based on the efficient-fit selection. In other words, system 150 can only consider currently unassigned counter banks for reallocation regardless of the selection policy.

However, if system 150 releases counter bank 306 from logical counter bank 338 (e.g., due to an update based on a user command), system 150 may re-evaluate the allocation of counter banks to each logical counter bank. During the re-evaluation process, system 150 can determine that allocating counter bank 306 to logical counter bank 138 to 2a+b can satisfy the efficient-fit. Accordingly, system 150 can incorporate counter bank 306 into logical counter bank 138, and release counter banks 132 and 136 for a subsequent allocation. In the same way, system 150 can iteratively apply a selection policy to a logical TCAM unit when system 150 releases a TCAM unit due to a reallocation.

Figure 3C:
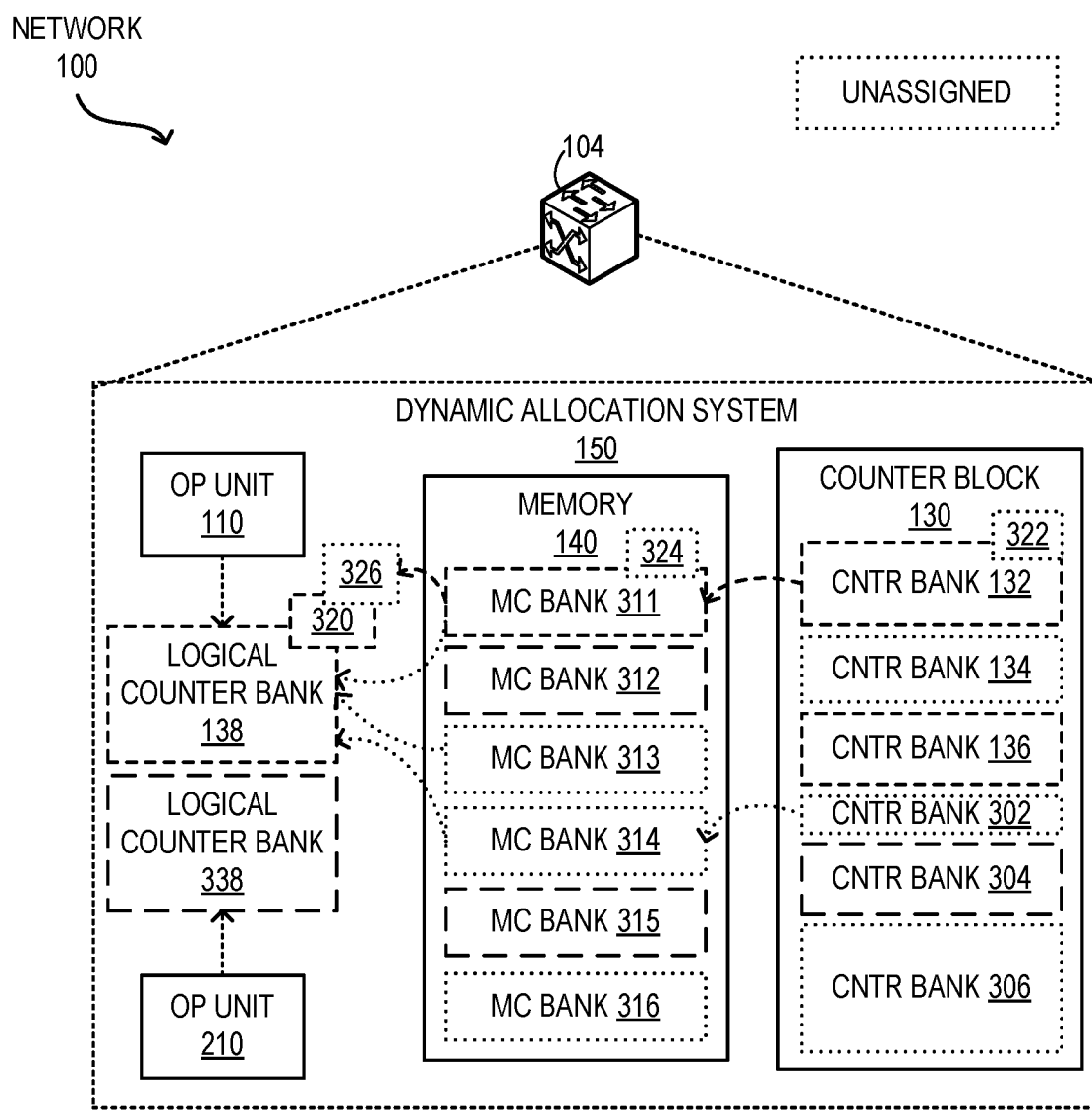
FIG. 3C illustrates an exemplary process of dynamically decreasing counter resources allocated to an operational unit of a switch, in accordance with an embodiment of the present application.

FIG. 3C illustrates an exemplary process of dynamically decreasing counter resources allocated to an operational unit of a switch, in accordance with an embodiment of the present application. During operation, the user may determine that logical counter bank 138 can operate with a fewer number of counters for operational unit 110. The user can then issue a command to system 150 for dynamically decreasing the capacity of logical counter bank 138 to a new target capacity (e.g., from 2a counters to b counters). System 150 can then mark the freed counter bank(s) as unavailable so that the freed counter bank(s) can be reallocated to another operational unit. System 150 can remove a counter bank from logical counter bank 138 based on the user command without interrupting traffic at switch 104.

For the efficient-fit selection, system 150 can select the target counter bank(s) with the smallest capacity that can accommodate the target capacity with the minimum residual capacity. System 150 can then determine whether data transfer is required for the selection based on whether the target counter bank replaces currently allocated counter banks. Subsequently, system 150 can determine that available counter banks 134, 302, and 306 have capacities a, b, and c, respectively. Since the target capacity is b counters, system 150 can select counter bank 302 as the target counter bank.

Since counter bank 302 may replace currently allocated counter banks 132 and 136 (i.e., counter banks 132 and 136 are the decrement counter banks), system 150 can determine that data transfer is required. System 150 can then incorporate counter bank 302 into logical counter bank 138, and release counter banks 132 and 136 for subsequent allocation (denoted with dotted arrows). System 150 can perform the reallocation as an atomic operation. To incorporate counter bank 302 into logical counter bank 138, system 150 can add the values from a respective counter and the corresponding memory counter to the accumulation counter. For example, system 150 can add the values from counter 322 and memory counter 324 to the current value of accumulation counter 326 associated with logical counter 320. System 150 can then map logical counter 320 to the corresponding counter of counter bank 302. In this way, the counter values accumulated by counter 322 and memory counter 324 are preserved by accumulation counter 326 of logical counter 320.

On the other hand, for incremental-fit selection, system 150 can select one of counter banks 132 and 136 that can support at least b entries. If the capacities of counter banks 132 and 136 are larger than the target capacity (e.g., a>b), system 150 can determine which counter bank can accommodate the valid counters of the other counter bank. If neither of counter banks 132 and 136 can accommodate the other counter bank's valid counters, system 150 may fall back to another allocation policy or provide an error message to the user. On the other hand, if counter banks 132 and 136 can, system 150 can select one of counter banks 132 and 136 with the minimum residual capacity.

Suppose that system 150 has selected counter bank 132 (i.e., counter bank 132 is the decrement counter bank) for removal. System 150 can determine a summation of a respective valid counter value from counter bank 132 and the corresponding memory counter value from memory counter bank 311. System 150 can then store the summation in the accumulation counter of the associated logical counter. For example, system 150 can then determine a summation of the value of counter 322 and the value of memory counter 324, and store the summation in accumulation counter 326 of logical counter 320. Subsequently, system 150 can map the logical counters that have been mapped to the counters of counter bank 132 to the new counters of counter bank 136. System 150 can perform the reallocation of logical counters as an atomic operation by writing in the register that specifies which physical counters belong to logical counter bank 138. In this way, system 150 can reduce logical counter bank 138 without interrupting the traffic in switch 104.

Operations

Figure 4A:
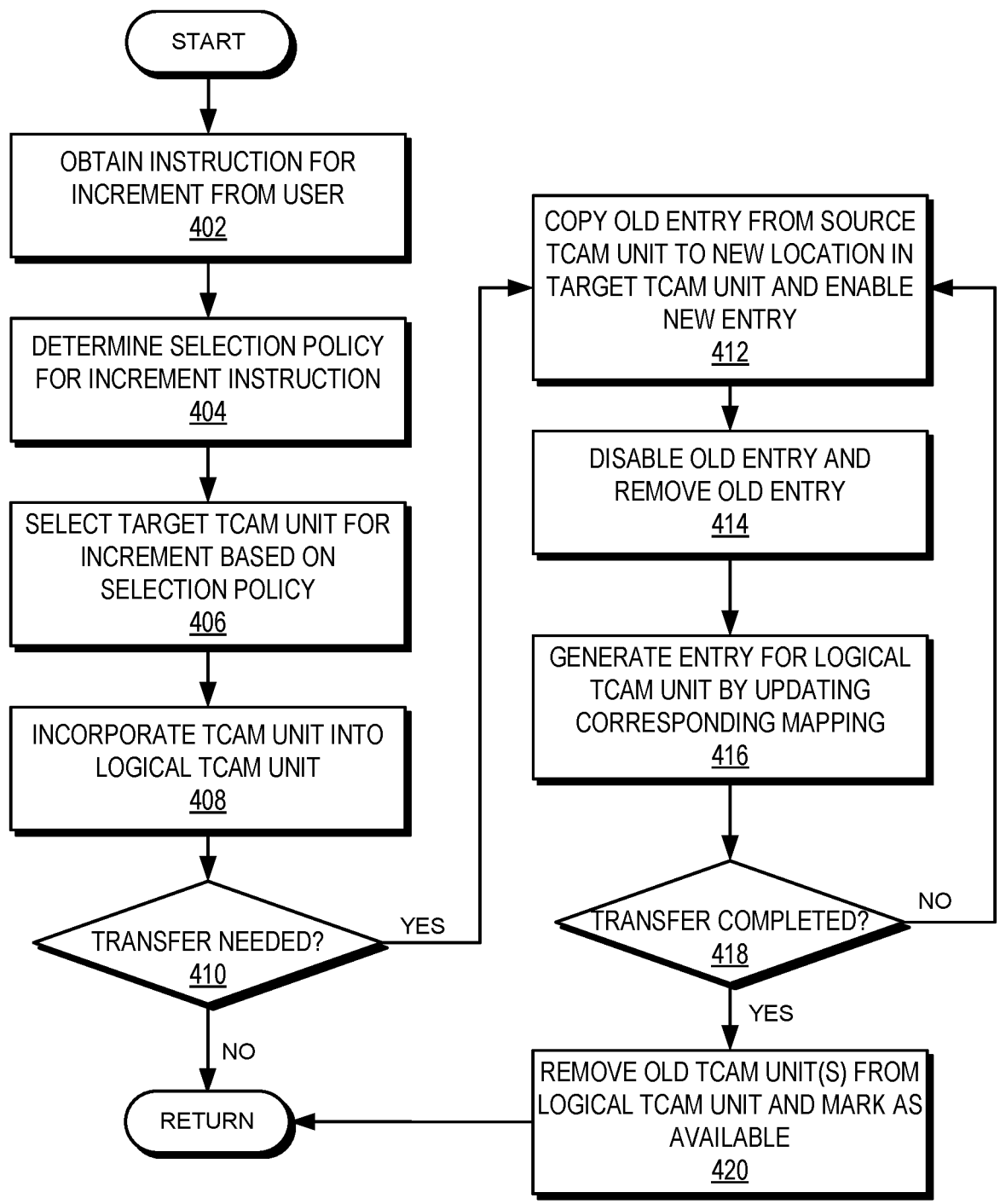
FIG. 4A presents a flowchart illustrating the process of a switch dynamically increasing memory resources allocated to an operational unit of the switch, in accordance with an embodiment of the present application.

FIG. 4A presents a flowchart illustrating the process of a switch dynamically increasing memory resources allocated to an operational unit of the switch, in accordance with an embodiment of the present application. During operation, a dynamic allocation system of the switch can obtain an instruction for increment from a user (operation 402) and determine a selection policy for an increment instruction (operation 404). The system can then select a target TCAM unit for the increment based on the selection policy (operation 406) and incorporate the TCAM unit into the logical TCAM unit (operation 408). The system can check whether data transfer is needed (operation 410).

If data transfer is needed, the system can copy an old entry from a source TCAM unit to a new location in the target TCAM unit and enable the new entry (operation 412). The system can then disable the old entry and remove the old entry (operation 414). Subsequently, the system can generate an entry for the logical TCAM unit by updating the corresponding mapping (operation 416). The system can determine whether the transfer has been completed (operation 418). If not completed, the system can continue to copy an entry to a new location in the target TCAM unit and disable an old entry in the current TCAM unit (operation 412). If the transfer is completed, the system can remove the old TCAM unit(s) from the logical TCAM unit and mark it as available (operation 420).

Figure 4B:
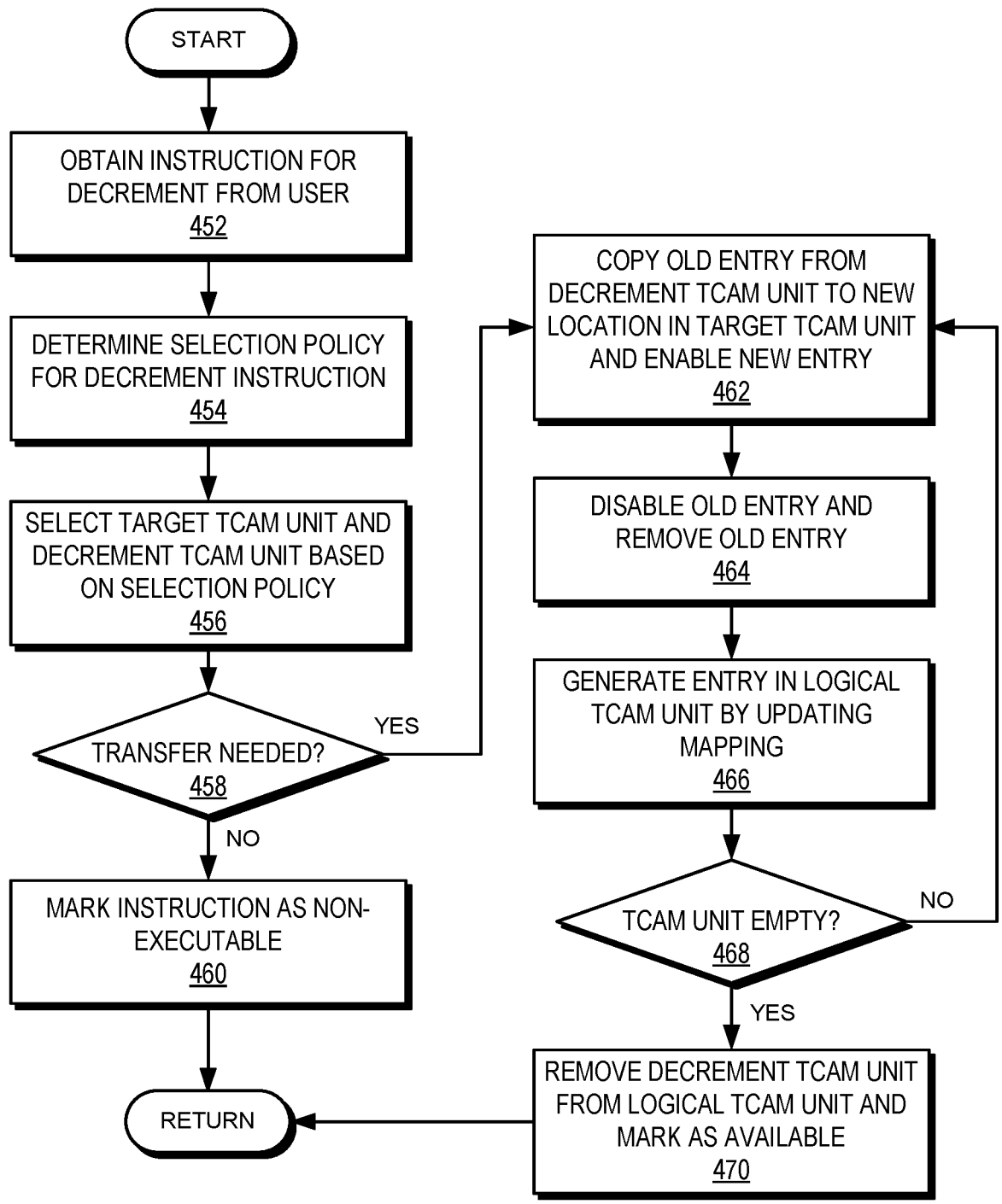
FIG. 4B presents a flowchart illustrating the process of a switch dynamically decreasing memory resources allocated to an operational unit of the switch, in accordance with an embodiment of the present application.

FIG. 4B presents a flowchart illustrating the process of a switch dynamically decreasing memory resources allocated to an operational unit of the switch, in accordance with an embodiment of the present application. During operation, a dynamic allocation system of the switch can obtain an instruction for decrement from a user (operation 452) and determine a selection policy for the decrement instruction (operation 454). The system can then select a target TCAM unit and a decrement TCAM unit based on the selection policy (operation 456). Subsequently, the system can determine whether data transfer is needed (operation 458). If data transfer is not needed, the system can mark the instruction as non-executable (issue an error message for the user) (operation 462).

If data transfer is needed, the system can copy an old entry from a decrement TCAM unit to a new location in the target TCAM unit and enable the new entry (operation 462). The system can then disable the old entry and remove the old entry (operation 464). Subsequently, the system can generate an entry for the logical TCAM unit by updating the corresponding mapping (operation 466). The system can determine whether the TCAM unit is empty (operation 468). If the TCAM unit is not empty, the system can continue to copy an entry to a new location in the target TCAM unit and disable an old entry in the current TCAM unit (operation 462). If the transfer is completed, the system can remove the decrement TCAM unit from the logical TCAM unit and mark it as available (operation 470).

Figure 5A:
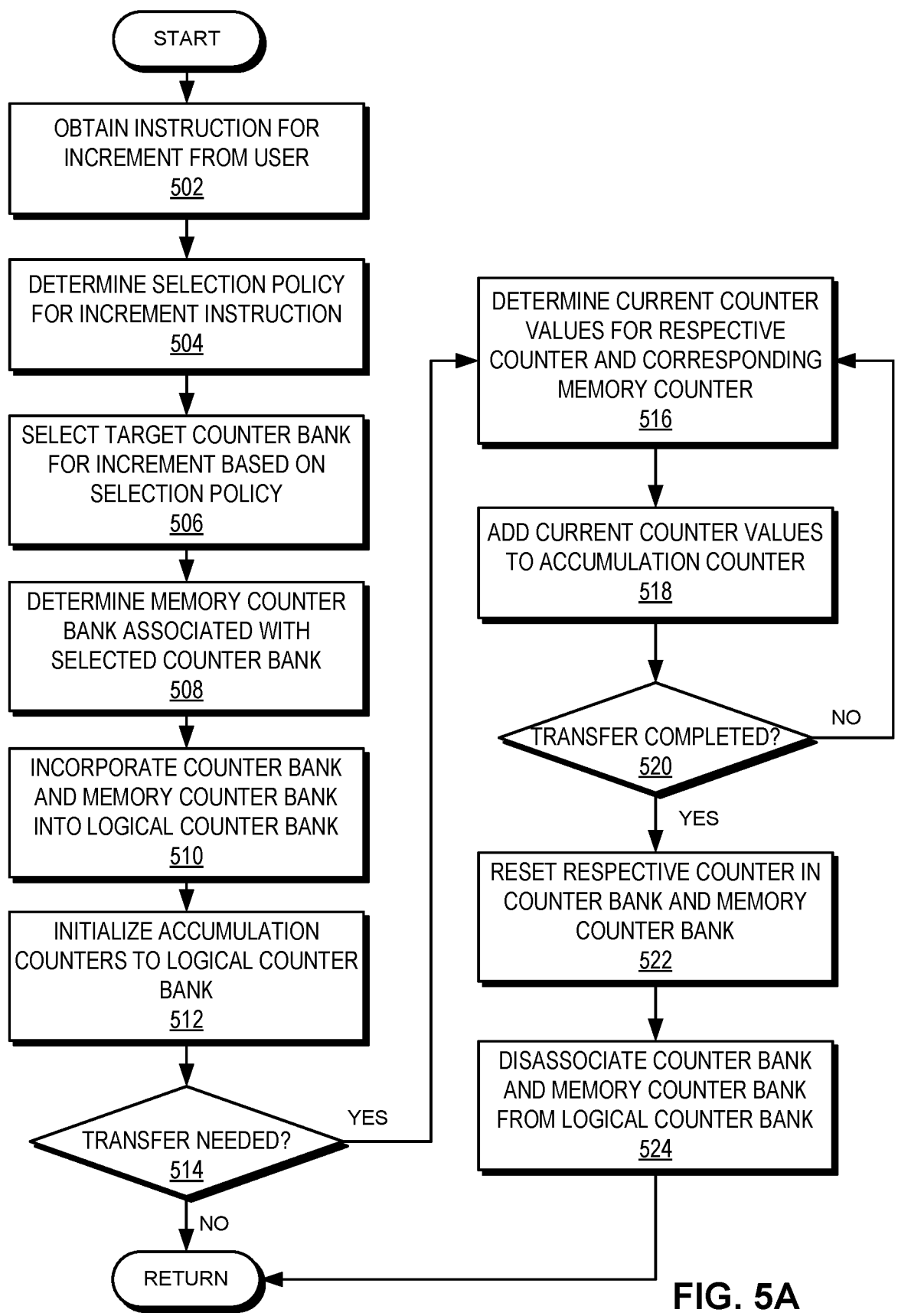
FIG. 5A presents a flowchart illustrating the process of a switch dynamically increasing counter resources allocated to an operational unit of the switch, in accordance with an embodiment of the present application.

FIG. 5A presents a flowchart illustrating the process of a switch dynamically increasing counter resources allocated to an operational unit of the switch, in accordance with an embodiment of the present application. During operation, a dynamic allocation system of the switch can obtain an instruction for increment from a user (operation 502) and determine a selection policy for an increment instruction (operation 504). The system can then select a target counter bank for the increment based on the selection policy (operation 506) and determine a memory counter bank associated with the selected counter bank (operation 508). Subsequently, the system can incorporate the counter bank and the memory counter bank into the logical counter bank (operation 510) and initialize accumulation counters to the logical counter bank (operation 512).

The system can check whether data transfer is needed (operation 514). The system can then determine the current counter values for a respective counter and corresponding memory counter (operation 516) and add the current counter values to the accumulation counter (operation 518). The system can determine whether the transfer has been completed (operation 520). If not completed, the system can continue to determine the current counter values for a respective counter and corresponding memory counter (operation 516). If the transfer is completed, the system can reset counter values in the counter bank and the memory counter bank (operation 522). Subsequently, the system can disassociate the counter bank and memory counter bank from the logical counter bank (operation 524).

Figure 5B:
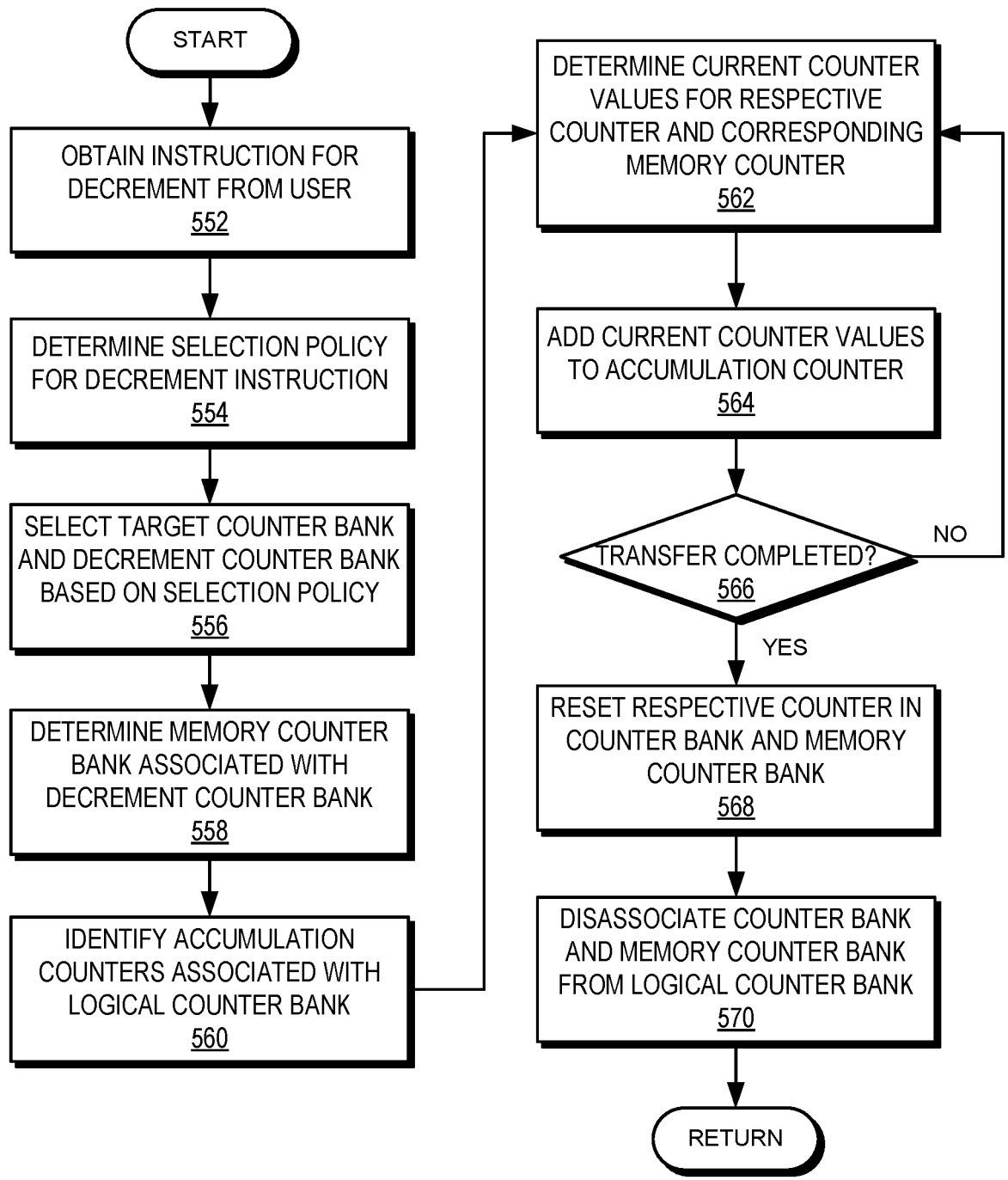
FIG. 5B presents a flowchart illustrating the process of a switch dynamically decreasing counter resources allocated to an operational unit of the switch, in accordance with an embodiment of the present application.

FIG. 5B presents a flowchart illustrating the process of a switch dynamically decreasing counter resources allocated to an operational unit of the switch, in accordance with an embodiment of the present application. During operation, a dynamic allocation system of the switch can obtain an instruction for decrement from a user (operation 552) and determine a selection policy for the decrement instruction (operation 554). The system can then select a target counter bank and a decrement counter bank based on the selection policy (operation 556). Subsequently, the system can determine the memory counter bank associated with the decrement counter bank (operation 558) and identify accumulation counters associated with the logical counter bank (operation 560).

The system can then determine the current counter values for a respective counter and corresponding memory counter (operation 562) and add the current counter values to the accumulation counter (operation 564). The system can determine whether the transfer has been completed (operation 566). If not completed, the system can continue to determine the current counter values for a respective counter and corresponding memory counter (operation 562). If the transfer is completed, the system can reset counter values in the counter bank and the memory counter bank (operation 568). Subsequently, the system can disassociate the counter bank and memory counter bank from the logical counter bank (operation 570).

Exemplary Switch System

Figure 6:
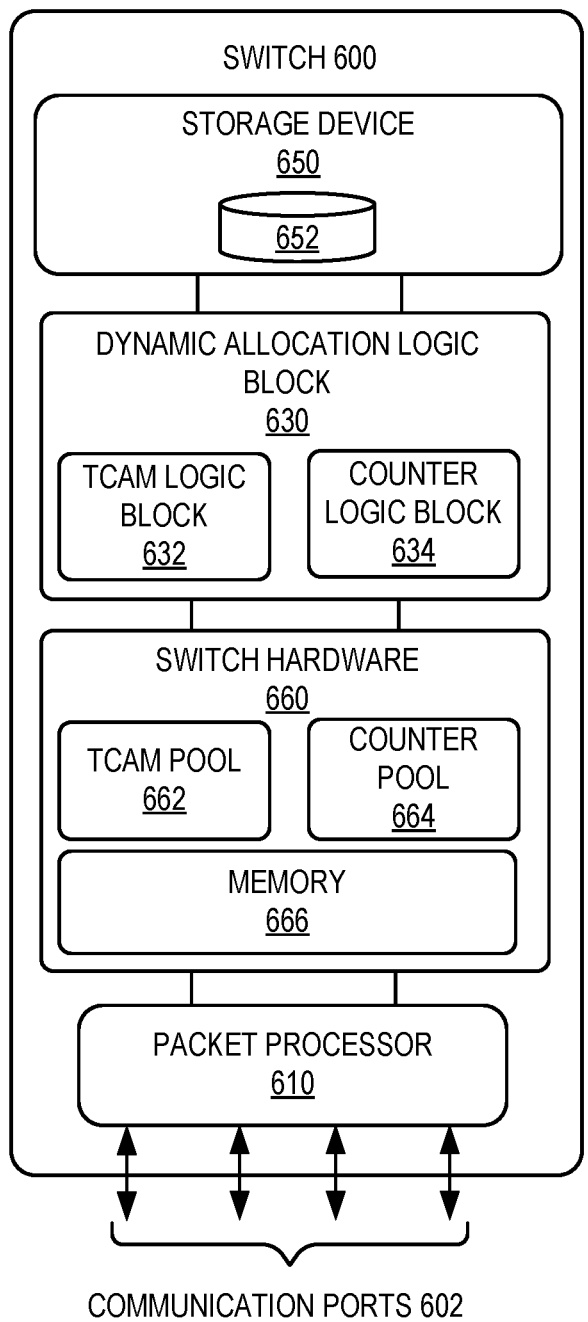
FIG. 6 illustrates an exemplary switch supporting efficient multicast forwarding across overlay tunnels, in accordance with an embodiment of the present application.

FIG. 6 illustrates an exemplary switch supporting efficient multicast forwarding across overlay tunnels, in accordance with an embodiment of the present application. In this example, a switch 600 includes a number of communication ports 602, a packet processor 610, a dynamic allocation logic block 630, and a storage device 650. Switch 600 can also include switch hardware (e.g., processing hardware of switch 600, such as its application-specific integrated circuit (ASIC) chips), which includes a TCAM pool 662, a counter pool 664, and a memory (e.g., an SRAM). Packet processor 610 extracts and processes header information from the received packets. Packet processor 610 can identify a switch identifier (e.g., a media access control (MAC) address and/or an IP address) associated with switch 600 in the header of a packet.

Communication ports 602 can include inter-switch communication channels for communication with other switches and/or user devices. The communication channels can be implemented via a regular communication port and based on any open or proprietary format. Communication ports 602 can include one or more Ethernet ports capable of receiving frames encapsulated in an Ethernet header. Communication ports 602 can also include one or more IP ports capable of receiving IP packets. An IP port is capable of receiving an IP packet and can be configured with an IP address. Packet processor 610 can process Ethernet frames and/or IP packets.

Switch 600 can maintain a database 652 (e.g., in storage device 650). Database 652 can be a relational database and may run on one or more DBMS instances. Dynamic allocation logic block 630 can facilitate the operations of system 150. TCAM logic block 632 can organize the TCAM units of switch 600 as TCAM pool 662 and dynamically allocate TCAM units to an operational unit of switch 600. Furthermore, TCAM logic block 632 can represent the allocated TCAM units as a logical TCAM unit to the operational unit. TCAM logic block 632 can also dynamically increase/decrease the capacity of the logical TCAM unit during the runtime of switch 600 without disrupting traffic.

Similarly, counter logic block 634 can organize the counter banks (e.g., a set of counter RAMs) of switch 600 as counter pool 664 and dynamically allocate counter banks to the operational unit. Counter logic block 634 can further maintain memory counter banks for a respective counter bank in memory 666 and flush a counter value to a corresponding memory counter. Furthermore, counter logic block 634 can represent the allocated counter banks as a logical counter bank to the operational unit.

Counter logic block 634 can also dynamically increase/decrease the capacity of the logical counter bank during the runtime of switch 600 without disrupting traffic. Counter logic block 634 can further maintain accumulation counters for a respective logical counter of the logical counter block (e.g., at the software-level). Counter logic block 634 may incorporate the values of a counter and its corresponding memory counter into an accumulation counter.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disks, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

The methods and processes described herein can be executed by and/or included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

The foregoing descriptions of embodiments of the present invention have been presented only for purposes of illustration and description. They are not intended to be exhaustive or to limit this disclosure. Accordingly, many modifications and variations will be apparent to practitioners skilled in the art. The scope of the present invention is defined by the appended claims.

What is claimed is:

1. A method for facilitating dynamic resource allocation in a switch, comprising:
    representing, to an operational unit of the switch, a first subset of hardware elements of the switch that are allocated to the operational unit as a logical element within the switch, wherein the operational unit facilitates, in the switch, a capability of performing an operation of the switch in a network using the hardware elements allocated to the operational unit;
    determining a request for dynamic reallocation of the hardware elements to the operational unit during runtime of the switch;
    determining whether the reallocation of the hardware elements is feasible in the switch;
    in response to the reallocation of the hardware units being feasible, allocating a second subset of the hardware elements to the operational unit during runtime of the switch; and
    incorporating the second subset of the hardware elements into the logical element.

2. The method of claim 1, wherein the hardware elements of the switch include a set of ternary content-addressable memory (TCAM) units, and wherein the logical element is a logical TCAM unit presented to the operational unit.

3. The method of claim 1, wherein the hardware elements of the switch include a set of memory segments of a central memory of the switch, and wherein the logical element is a logical memory segment presented to the operational unit.

4. The method of claim 1, wherein the hardware elements of the switch include a set of counter banks of hardware-based counters, and wherein the logical element is a logical counter bank presented to the operational unit.

5. The method of claim 4, wherein the hardware elements of the switch further includes a set of memory counter banks maintained in a central memory of the switch; and
wherein the method further comprises flushing a current value of a respective counter of a counter bank to a corresponding memory counter, wherein the counter is represented as a logical counter in the logical counter bank.

6. The method of claim 5, further comprising maintaining an accumulation counter for the logical counter; and
wherein allocating the second subset of the hardware elements comprises:
adding respective values of the counter and the corresponding memory counter to the accumulation counter; and
re-associating the logical counter to a new counter in the second subset of the hardware elements.

7. The method of claim 1, wherein the reallocation of the hardware elements includes increasing or decreasing the first subset of the hardware elements to the second subset of the hardware elements;
wherein the method further comprises:
determining a target hardware element for the first subset of the hardware elements based on a selection policy; and
generating the second subset of the hardware elements from the first subset of the hardware elements.

8. The method of claim 7, wherein determining whether the reallocation of the hardware elements is feasible comprises determining whether the target hardware element is capable of accommodating valid data from the first subset of the hardware elements.

9. The method of claim 1, further comprising indicating, in a register of the switch, that the first subset of the hardware elements belongs to the logical element; and
wherein incorporating the second subset of the hardware elements into the logical element comprises updating the register to indicate that the second subset of the hardware elements belongs to the logical element.

10. The method of claim 1, further comprising:
determining whether dynamic reallocation of a third subset of hardware elements allocated to a second operational unit is needed due to the allocation of the second subset of the hardware elements to the operational unit; and
in response to determining that dynamic reallocation to the second operational unit is needed, dynamically allocating a fourth subset of the hardware elements to the second operational unit.

11. The method of claim 1, further comprising:
receiving a command indicating the request for dynamic reallocation of the hardware elements for the operational unit; and
determining reallocation operations and parameters for the dynamic reallocation.

12. A computer system, comprising:
a processor;
a storage device; and
a memory coupled to the processor and storing instructions, which when executed by the processor cause the processor to perform a method for facilitating dynamic resource allocation in a switch, the method comprising:
representing, to an operational unit of the switch, a first subset of hardware elements of the switch that are allocated to the operational unit as a logical element within the switch, wherein the operational unit facilitates, in the switch, a capability of performing an operation of the switch in a network using the hardware elements allocated to the operational unit;
determining a request for dynamic reallocation of the hardware elements to the operational unit during runtime of the switch;
determining whether the reallocation of the hardware elements is feasible in the switch;
in response to the reallocation of the hardware units being feasible, allocating a second subset of the hardware elements to the operational unit during runtime of the switch; and
incorporating the second subset of the hardware elements into the logical element.

13. The computer system of claim 12, wherein the hardware elements of the switch include a set of ternary content-addressable memory (TCAM) units, and wherein the logical element is a logical TCAM unit presented to the operational unit.

14. The computer system of claim 12, wherein the hardware elements of the switch include a set of memory segments of a central memory of the switch, and wherein the logical element is a logical memory segment presented to the operational unit.

15. The computer system of claim 12, wherein the hardware elements of the switch include a set of counter banks of hardware-based counters, and wherein the logical element is a logical counter bank presented to the operational unit.

16. The computer system of claim 15, wherein the hardware elements of the switch further includes a set of memory counter banks maintained in a central memory of the switch; and
wherein the method further comprises flushing a current value of a respective counter of a counter bank to a corresponding memory counter, wherein the counter is represented as a logical counter in the logical counter bank.

17. The computer system of claim 16, wherein the method further comprises maintaining an accumulation counter for the logical counter; and
wherein allocating the second subset of the hardware elements comprises:
adding respective values of the counter and the corresponding memory counter to the accumulation counter; and
re-associating the logical counter to a new counter in the second subset of the hardware elements.

18. The computer system of claim 12, wherein the reallocation of the hardware elements includes increasing or decreasing the first subset of the hardware elements to the second subset of the hardware elements;
wherein the method further comprises:
determining a target hardware element for the first subset of the hardware elements based on a selection policy; and generating the second subset of the hardware elements from the first subset of the hardware elements.

19. The computer system of claim 18, wherein determining whether the reallocation of the hardware elements is feasible comprises determining whether the target hardware element is capable of accommodating valid data from the first subset of the hardware elements.

20. The computer system of claim 12, wherein the method further comprises indicating, in a register of the switch, that the first subset of the hardware elements belongs to the logical element; and
    wherein incorporating the second subset of the hardware elements into the logical element comprises updating the register to indicate that the second subset of the hardware elements belongs to the logical element.

21. The computer system of claim 12, wherein the method further comprises:
    determining whether dynamic reallocation of a third subset of hardware elements allocated to a second operational unit is needed due to the allocation of the second subset of the hardware elements to the operational unit; and
    in response to determining that dynamic reallocation to the second operational unit is needed, dynamically allocating a fourth subset of the hardware elements to the second operational unit.

22. The computer system of claim 12, wherein the method further comprises:
    receiving a command indicating the request for dynamic reallocation of the hardware elements for the operational unit; and
    determining reallocation operations and parameters for the dynamic reallocation.

\* \* \* \* \*